Patented Sept. 7, 1937

2,092,512

UNITED STATES PATENT OFFICE 2,092,512

REABSORBABLE THREADS, BANDS, TUBES, AND THE LIKE

Willy O. Herrmann, Munich, Fritz Hammer, Bezirk Kassel, Hessen, and Wolfram Haehnel, Munich, Germany, assignors, by mesne assignments, to Chemische Forschungsgesellschaft m. b. H., Munich, Germany, a corporation of Germany No Drawing. Application October 14, 1933, Serial No. 693,674. In Germany October 17, 1932

13 Claims. (Cl. 128—335.5)

This invention relates to the production of reabsorbable threads, bands, tubes and other film-like articles of the type used by surgeons for closing or draining wounds, or for medical capsules and numerous other purposes in medical and non-medical arts.

The principal object of the invention is to produce reabsorbable articles of this type from materials which in themselves are not reabsorbable or are only slightly reabsorbable.

Another object of the invention is to produce reabsorbable surgical and medical threads, bands, tubes and the like which may be used freely in the human or animal system without causing suppuration or fistular formations.

Articles produced according to our invention are intended primarily as substitutes for catgut, silkwormgut, silk, linen thread, celluloid yarn, horsehair and the like, and they may be used to advantage in many situations where these common materials have been used in the past. One of the most important applications of the invention is in the field of surgery for making threads for sewing and internal stitching, buttons for joining intestines, tubes for stitches in nerves and for draining wounds, etc., and in medicine for the manufacture of capsules, pills, suppositories and the like.

There are several serious objections to the use of catgut, silk thread, etc., for surgical and medical purposes. For one thing, raw catgut, like its less efficient substitutes, is very difficult to sterilize and requires careful handling to guard against subsequent contamination. Furthermore, every competent surgeon knows that the body treats catgut as a foreign substance and attempts to reject it, causing suppuration and fistular formations which frequently result in the death of the patient. The common substitutes for catgut are open to the same objections and some of them are further lacking in tensile strength and resistance to fracture.

Recently Herrmann, Baum, and Haehnel in application Serial No. 596,570, filed March 3, 1932, and now Patent No. 2,072,302, dated March 2, 1937, have disclosed threads, bands, tubes and other articles made of polymerized vinyl alcohol, and we, in our application Serial No. 693,675, filed October 14, 1933, and now Patent No. 2,072,303, dated March 2, 1937, have disclosed similar articles made of polyvinyl compounds, etc., which are far superior to previously known materials for surgical, medical and other purposes. Important advantages of the said polymerized vinyl alcohol and polyvinyl compound articles are that they are endured by the body without causing suppuration and fistular formation, they are easily sterilized and remain sterilized, they possess great tensile strength and resistance to fracture, and may be made more or less resorptive as required.

Now, after exhaustive research we have discovered that certain other materials suitable for surgical purposes mentioned but not resorptive or only slightly resorptive such as carbohydrates, glutine, pectin, glue, albumin, isinglass, and other substances especially catgut, silk, fibres of hemp cellulose, cellulose derivatives and the like, may be made reabsorbable by proper treatment and thereby rendered useful for many purposes in surgical, medical and other fields in which they have heretofore been of little use. We have found, for example, that resorption of cellulose materials is promoted by the addition of or admixture with organic acids such as oxalic acid, malic acid and lactic acid, and especially those acids which are substituted with negative or positive residues such as sulfo salicylic acid, benzol sulfonic acid, toluol sulfonic acid, tri-chlor acetic acid and amino acids such as glycocoll and aspartic acid; also phenyl hydrazine chlorhydrate; and likewise inorganic electrolytes such as borax, nickel nitrate, potassium bichromate, etc.

For example, acetylcellulose threads, etc., may be made reabsorbable by the addition of trichlor acetic acid, sulfo salicylic acid, benzol sulfonic acid, oxalic acid, phenyl hydrazine chlorhydrate and other substances. Our invention not only contemplates increasing the reabsorability of viscose and other cellulose compounds, but also comprises the preparation of threads, bands, tubes and the like composed of mixtures of such cellulose compounds or of reesterification products such as that obtained by treating cellulose acetate with sulfo salicylic acid, and mixtures of cellulose compounds with polyvinyl compounds of the type disclosed in the above Herrmann et al. applications. The said polyvinyl compounds include polyvinyl alcohol, the esters, ethers and acetals of polyvinyl alcohol, the esters of polyacrylic acid and polyitaconic acid, and polystyrols.

The invention is not limited to the production of threads, bands or tubes, or to any of the other articles which are cited herein by way of example. Articles prepared according to our invention may be formed in various ways as by forming a viscous solution or paste by dissolving or soaking the cellulose compounds, etc. in a suitable solvent. A small percentage, for example from 5 to 10%, of resorption-promoting substance is usually sufficient as addition, and by properly proportioning the amount of the reabsorbability of the product may be optionally graduated. From these prepared solutions or pastes, threads, bands, tubes, etc. can easily be made, for example by causing a solution or paste of the proper viscosity or temperature to form drops from which threads are made. This may be accomplished by placing the solution or paste in a container having a perforated bottom. Or the solution or paste may, if desired, be treated according to the processes used in the manufacture of artificial silk, such as stretching the thread, influencing the evaporation of the solvent, using a precipitate bath, etc. The solidification of the protruding threads and the like can be promoted by chilling to low temperatures. Other modifications of the invention include the treatment of natural threads and the like to render them reabsorbable, excellent results having been obtained by thoroughly impregnating silk with the above resorption-promoting substances and by treating catgut with a saturated solution of nickel nitrate.

The strength of the threads, bands, tubes, etc., produced according to this invention may be increased if desired by the addition of suitable substances to the mixtures from which the threads, etc. are prepared. This may be accomplished by the addiiton of suitable electrolytes such as sulfo cyanogen compounds among which potassium or ammonium rhodanide may be cited by way of example. A very considerable strengthening is also obtained by the addition of sugars such as glucose. Various other materials may also be added to the solutions, pastes, etc. to give the product a bactericidal effect. Any suitable bactericidal substance may be used for this purpose. Among others may be mentioned the esters of aromatic acids, such as propylbenzoate, which also augment the mechanical strength of the product under certain conditions.

In addition to their wide application in the field of surgery, cellulose compounds made reabsorbable according to our invention are suitable for many other purposes. They are particularly useful for medical purposes in the form of capsules, pills, suppositories and the like with therapeutically effective additions or contents. They are also generally useful in non-medical fields wherever reabsorbable substitutes for ordinary cellulose products are desirable.

The invention claimed is:

1. Threads, bands, tubes and the like consisting of a mixture of cellulose and polyvinyl alcohol, in combination with a material which promotes the reabsorbability thereof.

2. Threads, bands, tubes and the like consisting of a mixture of cellulose and a material selected from the group consisting of polyvinyl alcohol, the esters, ethers and acetals of polyvinyl alcohol, the esters of polyacrylic acid and polyitaconic acid and polystyrols, in combination with a material which promotes the reabsorbability thereof.

3. Surgical resorptive threads, bands, tubes and the like consisting of a mixture of cellulose and at least one water soluble inorganic or neutral organic electrolyte.

4. Surgical resorptive threads, bands, tubes and the like consisting of a mixture composed of a material selected from the group consisting of cellulose, the esters and ethers of cellulose, and viscose, and at least one water soluble inorganic or neutral organic electrolyte.

5. Surgical resorptive threads, bands, tubes and the like consisting of a mixture of cellulose, a material selected from the group consisting of the esters of polyitaconic acid and polystyrols, and at least one water soluble inorganic or neutral organic electrolyte.

6. Surgical resorptive threads, bands, tubes and the like consisting of a mixture of cellulose, at least one water soluble inorganic or neutral organic electrolyte, and a bactericidal substance.

7. Surgical resorptive threads, bands, tubes and the like consisting of a mixture of cellulose, at least one water soluble inorganic or neutral organic electrolyte, and a substance increasing the strength of said composition.

8. Surgical resorptive threads, bands, tubes and the like consisting of a mixture composed of at least one member selected from the group consisting of carbohydrates, glutine, pectin, glue, albumin, isinglass, catgut, silk, fibers of hemp, cellulose and cellulose derivatives and at least one water soluble inorganic or neutral organic electrolyte.

9. Threads, bands and tubes adapted for internal surgical application and capsules, pills, suppositories and the like adapted for medical purposes incapable of causing suppuration and fistular formation substantially consisting of a mixture of cellulose and at least one resorptive material selected from the group of acids consisting of oxalic acid, malic acid, lactic acid, sulfosalicylic acid, benzol sulfonic acid, trichloracetic acid, glycocoll, aspartic acid, phenyl hydrazine chlorhydrate, and solutions of borax, nickel nitrate, and potassium bichromate.

10. Threads, bands and tubes adapted for internal surgical application and capsules, pills, suppositories and the like adapted for medical purposes and which, when sterile, are incapable of causing suppuration and fistular formation substantially consisting of a mixture composed of at least one member selected from the group consisting of cellulose, the esters and ethers of cellulose and viscose treated with at least one resorptive material selected from the group of acids consisting of oxalic acid, malic acid, lactic acid, sulfosalicylic acid, benzol sulfonic acid, toluol sulfonic acid, trichlor acetic acid, glycocoll aspartic acid, phenyl hydrazine chlorhydrate, and solutions of borax, nickel nitrate and potassium bichromate.

11. Threads, bands and tubes adapted for internal surgical application and capsules, pills, suppositories and the like adapted for medical purposes and which, when sterile, are incapable of causing suppuration and fistular formation substantially consisting of a mixture of cellulose and at least one material selected from the group consisting of polyvinyl alcohol, the esters and ethers and acetals of polyvinyl alcohol, the esters of polyacrylic acid and polyitaconic acid, and polystyrols and at least one resorptive material selected from the group of acids consisting of oxalic acid, malic acid, lactic acid, sulfosalicylic acid, benzol sulfonic acid, toluol sulfonic acid, trichlor acetic acid, glycocoll, aspartic acid, phenyl hydrazine chlorhydrate, and solutions of borax, nickel nitrate and potassium bichromate.

12. Threads, bands and tubes adapted for internal surgical application and capsules, pills, suppositories and the like adapted for medical purposes and which, when sterile, are incapable of causing suppuration and fistular formation substantially consisting of a mixture composed of at least one member selected from the group consisting of cellulose, the esters and ethers of cellulose and viscose and at least one water soluble inorganic or neutral organic electrolyte.

13. Threads, bands and tubes adapted for internal surgical application and capsules, pills, suppositories and the like adapted for medical purposes and which, when sterile, are incapable of causing suppuration and fistular formation substantially consisting of a mixture of cellulose, at least one material selected from the group consisting of polyvinyl alcohol, the esters, ethers and acetals of polyvinyl alcohol, the esters of polyitaconic acid and polystyrols, and at least one water soluble inorganic or neutral organic electrolyte.

WILLY O. HERRMANN.
FRITZ HAMMER.
WOLFRAM HAEHNEL.